US009557172B2

(12) United States Patent
Waters et al.

(10) Patent No.: US 9,557,172 B2
(45) Date of Patent: Jan. 31, 2017

(54) NAVIGATION ASSISTANCE BASED ON VISUAL CODES

(71) Applicant: Texas Instruments Incorporated, Dallas, TX (US)

(72) Inventors: Deric Wayne Waters, Dallas, TX (US); Tarkesh Pande, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/054,252

(22) Filed: Feb. 26, 2016

(65) Prior Publication Data

US 2016/0195392 A1 Jul. 7, 2016

Related U.S. Application Data

(62) Division of application No. 13/571,501, filed on Aug. 10, 2012, now Pat. No. 9,303,986.

(Continued)

(51) Int. Cl.
*G01C 17/38* (2006.01)
*G01C 5/06* (2006.01)
(Continued)

(52) U.S. Cl.
CPC ............... *G01C 17/38* (2013.01); *G01C 5/06* (2013.01); *G01C 17/02* (2013.01); *G01P 15/00* (2013.01);
(Continued)

(58) Field of Classification Search
CPC ... G01C 25/005; G01C 19/5776; G01C 19/00; G06T 7/20; G01P 21/00
See application file for complete search history.

(56) References Cited

U.S. PATENT DOCUMENTS 4,184,368 A 1/1980 Holmes et al.
7,497,807 B2 * 3/2009 Neff .................... A63B 21/008
482/51

(Continued)

OTHER PUBLICATIONS

Renaudin et al.,"Complete Triaxis Magnetometer Calibration in the Magnetic Domain", Hindawi Publishing Corp, Journal of Sensors, vol. 2010, Article ID 967245, Calgary, AB, Canada, Sep. 6, 2010 (10 pages).

*Primary Examiner* — Elias Desta
(74) *Attorney, Agent, or Firm* — Kenneth Liu; Charles A. Brill; Frank D. Cimino

(57) ABSTRACT

Visual codes are scanned to assist navigation. The visual code may be a Quick Response (QR) code that contains information useful to calibrating a variety of navigation-based sensors such as gyroscopes, e-compasses, and barometric pressure sensors. In an embodiment, an imaging device, an e-compass, an accelerometer, and a processor are elements of a system. The processor is coupled to the imaging device, the e-compass, and the accelerometer. The processor causes the imaging device to scan a visual code, read a yaw angle from the visual code, and computes an estimate of a yaw angle based on magnetic field measurements taken by the e-compass. The processor generates scale factors and biases determined from measurements generated by the e-compass. Based on scanning the visual code, the processor computes a quality factor based on the yaw angle read from the visual code and the estimate of the yaw angle.

23 Claims, 3 Drawing Sheets

Related U.S. Application Data

(60) Provisional application No. 61/522,112, filed on Aug. 10, 2011.

(51) Int. Cl.
  *G06F 17/30* (2006.01)
  *G01C 17/02* (2006.01)
  *G01P 15/00* (2006.01)
  *G06K 7/10* (2006.01)
  *G06K 19/06* (2006.01)

(52) U.S. Cl.
  CPC ..... *G06F 17/30879* (2013.01); *G06K 7/10792* (2013.01); *G06K 19/06037* (2013.01)

(56) References Cited

U.S. PATENT DOCUMENTS

| | | | |
|---|---|---|---|
| 8,130,385 B2* | 3/2012 | Satoh | G06K 9/209 356/614 |
| 8,326,533 B2* | 12/2012 | Sachs | G01C 17/38 701/472 |
| 2011/0306323 A1 | 12/2011 | Do et al. | |
| 2014/0233804 A1 | 8/2014 | Gustavsson et al. | |

* cited by examiner

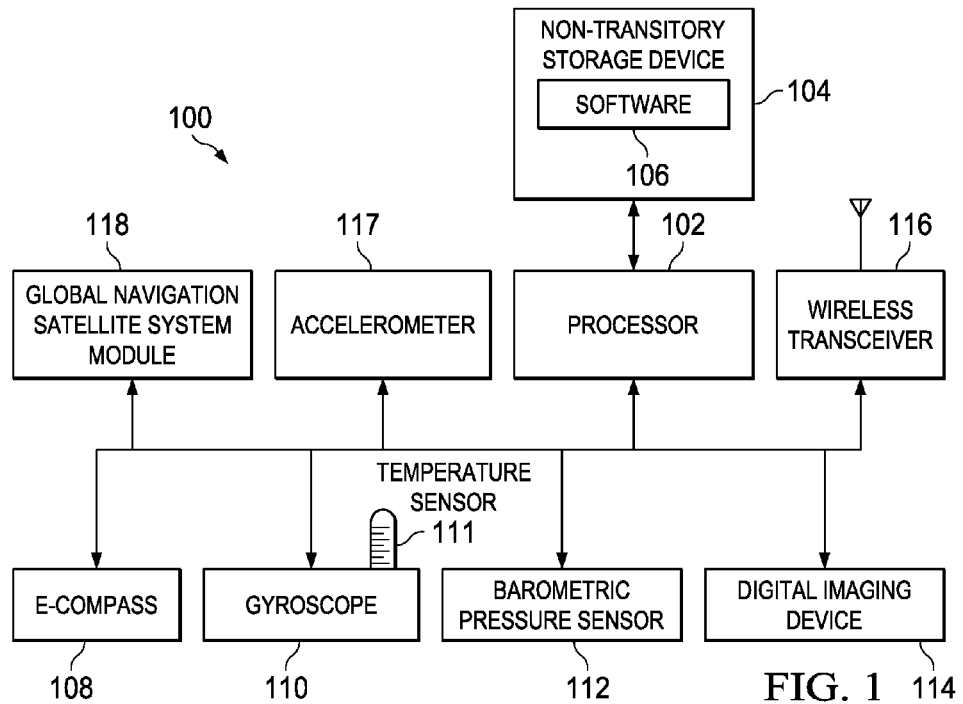
FIG. 1
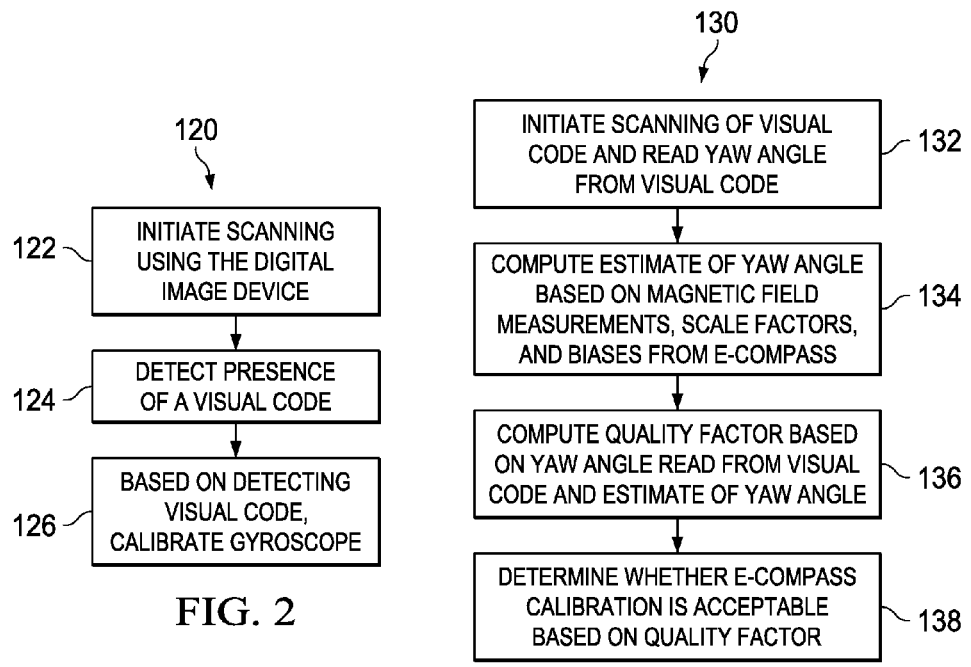
FIG. 2
FIG. 3

NAVIGATION ASSISTANCE BASED ON VISUAL CODES

CROSS-REFERENCE TO RELATED APPLICATION

This application is a Divisional of and claims priority to U.S. patent application Ser. No. 13/571,501, filed on Aug. 10, 2012, which in turn claims priority to U.S. Provisional Patent Application No. 61/522,112 filed on Aug. 10, 2011. Said applications are hereby incorporated herein by reference.

BACKGROUND

Many applications for smartphones use location information. Many smartphones include a global navigation satellite system (GNSS) such as the global positioning system (GPS). In an indoor environment, GNSS solutions do not always function accurately due to heavy attenuation of the satellite signals. Alternatives are available to GNSS such as sensor-based navigation and WiFi-based positioning.

Sensor-based solutions may include a micro-electrical-mechanical system (MEMS) sensor such as an accelerometer, an electronic compass (e-compass), gyroscope, etc. An issue in sensor-based solutions is sensor calibration. Sensors provide only user-displacement information, not absolute location. Thus, an initial position is required. The sensor can be used to determine position from that point forward as the smartphone becomes mobile. Measurement errors, however, eventually render the position determined from a sensor inaccurate.

SUMMARY

In some embodiments, a system includes an imaging device, a barometric pressure sensor, and a processor coupled to the imaging device and the pressure sensor. The processor causes the imaging device to scan a visual code. Based on scanning the visual code, the processor obtains a first value indicative of height of the visual code from the visual code and obtains a first barometric pressure reading from the pressure sensor. After scanning the visual code, the processor uses the first value indicative of height of the visual code and the first barometric pressure reading to determine a height of the system.

A corresponding method includes initiating scanning of a visual code and obtaining a first value indicative of height of the visual code from the visual code. The method further includes obtaining a first barometric pressure reading from a barometric pressure sensor. From a second height, a second barometric pressure reading is obtained from the barometric pressure sensor. The method includes computing a second value indicative of height based on the second barometric pressure reading, the first value indicative of the height of the visual code, and a rate of change of pressure with respect to height.

In other embodiments, a system includes an imaging device, an e-compass, an accelerometer, and a processor coupled to the imaging device, the e-compass, and the accelerometer. The processor causes the imaging device to scan a visual code, read a yaw angle from the QR code, and compute an estimate of a yaw angle based on magnetic field measurements taken by the e-compass and scale factors and biases determined by the e-compass. Based on scanning the visual code, the processor computes a quality factor based on the yaw angle read from the visual code and the estimate of the yaw angle. The processor determines whether the e-compass is satisfactorily calibrated based on the quality factor.

A corresponding method of calibrating an e-compass includes scanning a visual code, reading yaw angle from visual code, and computing an estimate of yaw angle based on magnetic field measurements, scale factors, and biases from the e-compass. The method further includes computing a quality factor based on the yaw angle read from the visual code the estimate of the yaw angle and determining whether calibration of the e-compass is acceptable based on the quality factor.

Other embodiments are directed to a system including an imaging device, a gyroscope, and a processor coupled to the imaging device and the gyroscope. The processor causes the imaging device to scan a visual code and, based on scanning the visual code, the processor causes the gyroscope to be calibrated.

A corresponding method includes initiating scanning using a digital image device, detecting the presence of a visual code, and based on detecting the visual code, calibrating a gyroscope.

BRIEF DESCRIPTION OF THE DRAWINGS

FIG. 1 shows a system in accordance with various implementations;

FIG. 2 shows a method of calibrating a gyroscope based on scanning a visual code such as a Quick Response (QR) code in accordance with various implementations;

FIG. 3 shows a method of calibrating an e-compass based on scanning a visual code in accordance with various implementations;

DETAILED DESCRIPTION

Figure 4:
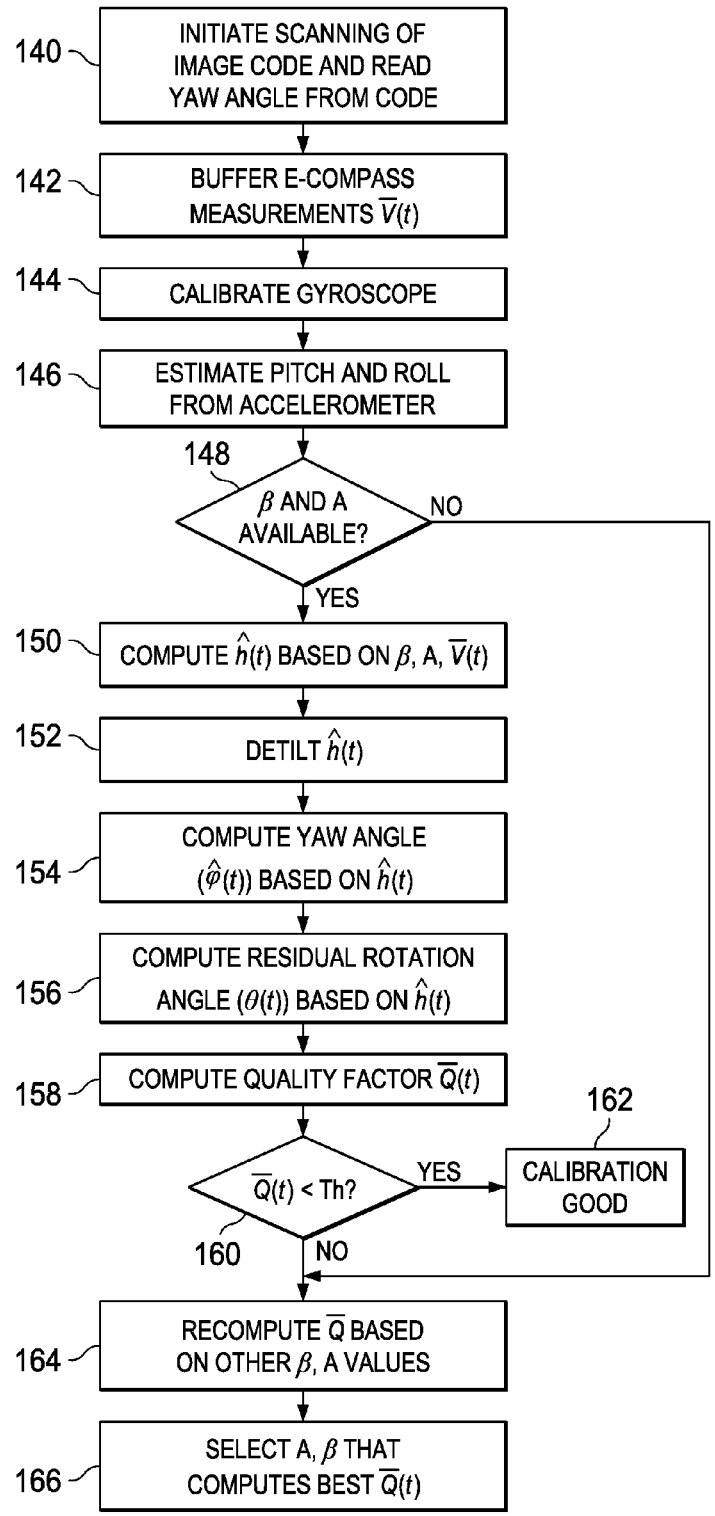
FIG. 4 shows a more specific implementation of a method of calibrating an e-compass based on scanning a visual code.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The term "visual code" refers to any type of graphic depiction that encodes information such as the information described herein. An example of a visual code is a Quick Response (QR). A QR code is a specific matrix barcode (or two-dimensional code) that is readable by QR barcode readers and camera telephones. The code includes black modules arranged in a square pattern on a white background. These and other visual features enable the code to be detected by a digital camera during as scan. The information encoded may be text, a uniform resource locator (URL), or other data such as the data described below for navigation assistance. Micro codes and Microsoft tags can also be used.

If the visual code is encoded with the coordinates of the code's location, then the sensor solution can provide displacement from that point. Coordinates could be in latitude, longitude, and altitude or in any other coordinate system. Coordinates on a specific map are possible. Coordinates could contain the level or floor in the building or altitude where the QR code is located.

FIG. 1 shows an example of a system 100 which provides navigation assistance. The system 100 may include a GNSS module (e.g., GPS) 118 for which the system provides navigation assistance when, for example, the GNSS module 118 is not adequate (e.g., inside a building). The illustrative system 100 as shown includes a processor 102 coupled to a non-transitory storage device 104, an e-compass 108, a gyroscope ("gyro" for short) 110, a barometric pressure sensor 112, a digital imaging device 114, a wireless transceiver 116, an accelerometer 117, and the GNSS module 118. Other implementations of system 100 may have additional or different components to that shown in FIG. 1. In some implementations, not all of the components shown in Figure are included.

The e-compass 108 is any suitable type of magnetic field sensors. Examples include triaxis anisotropic magnetoresistive (AMR) sensors. The gyro 110 also may be a multi-axis (e.g., 3-axis) device in some embodiments. The barometric pressure sensor 112 is a sensor that generates a signal based on the sensed barometric pressure.

The digital imaging device 114 may include a charge-coupled device (CCD) to acquire digital images, and provide such images to the processor 102 for further processing in accordance with software 106. The digital imaging device 114 may be a digital camera. The digital imaging device 114 may be used to scan visual codes as explained below for navigation assistance.

The accelerometer 117 preferably is a three-axis accelerometer.

The non-transitory storage device 104 is any suitable type of volatile storage (e.g., random access memory), non-volatile storage (e.g., hard disk, solid state storage, optical storage, read-only memory, etc.), or combinations thereof. The storage device 104 contains software 106 which is executable by processor 102 to impart the system 100 with some or all of the functionality described herein.

The system 100 may be a portable device such as a smartphone or any other type of mobile device.

The quality of a navigation solution which uses sensors depends on the type of sensors used. Low cost MEMS sensors, such as those found in PND and smart-phones, may drift over-time and hence continuous re-calibration of the sensor outputs is helpful. Calibration of such sensors may be performed based on comparison of the sensor outputs with positional information derived from an external reference e.g. imaging of a visual code or detection of an external event (e.g. stationarity detection).

As explained below, the system 100 of claim 1 may be used to calibrate the gyro 110, calibrate the e-compass 108, and calibrate the barometric pressure sensor 112.

Gyro Calibration

Gyroscope calibration is optimal when the user holds the system 100 stationary for a period of time. Because the user necessarily must hold the system 100 relatively stationary to scan the visual image, in accordance with preferred embodiments, scanning and detecting a visual code triggers the processor 102 to cause the gyro to begin a calibration process. The user preferably holds the system (and the digital imaging device 114 in particular) to the visual code for some time to enable the system to read the image. When the digital imaging device 114 and processor 102 recognize the presence of a visual code, the processor 102 preferably initiates gyro calibration as there will be a short moment in which the system is stationary. As such, the recognition of the visual code triggers gyro calibration. Even if the visual code does not contain location information, at least the gyro 110 nevertheless is calibrated. Once the gyro 110 is calibrated it can reliably track relative movements of the phone for a period of time.

Calibrating the gyro 110 may include averaging the output of the gyro corresponding to each axis of the gyro during an interval when the phone is stationary (e.g., during scanning of a visual code). The computed averages represent the gyro biases. Subsequently, new gyro measurements can be calibrated by subtracting these biases from such new measurements. The biases may be dependent on the temperature of the gyro 110. A temperature sensor 111 may be provided on or near the gyro to record the gyro's temperature when requested by the processor. The processor 102 may store the biases determined at various gyro temperatures in the non-volatile storage device 104.

In some embodiments, the visual code is encoded with position and heading values that are read by the system 100 via the digital imaging device 114. The position value indicates the location of the visual code. Examples of a position value include longitude and latitude, coordinates on a map, etc. Heading values indicate the direction that the system 100 is necessarily pointing upon scanning the visual code. An example of a heading value is "due east" and the like. If the visual code encodes the heading that the system 100 is pointing in addition to the position (i.e., location) of the system, then the gyro 114 can accurately track changes in the system's position and heading for some time afterwards depending on the quality of the gyro.

FIG. 2 illustrates a method 120 pertaining to gyro calibration. The various operations may be performed or caused to be performed by the processor 102 executing software 106 in combination with the gyro 110. At 122, the method includes initiating a scan using the digital imaging device 114. At 124, the processor 102 may detect the presence of a visual code in the digital images acquired by the digital imaging device 114. Based on detecting the presence of a visual code, the processor 102 initiates a gyro calibration process to occur (126).

E-Compass Calibration

When the user holds the smart phone camera towards the visual code, the phone will necessarily be pointing in a specific direction. If the visual code is encoded with the direction, the direction information may be used to assist with calibration of the e-compass.

By way of background, the equations that describe e-compass calibration may be as follows:

$$\begin{bmatrix} V_x(t) \\ V_y(t) \\ V_z(t) \end{bmatrix} = \begin{bmatrix} \alpha_x & s_{xy} & s_{xz} \\ s_{xy} & \alpha_y & s_{yz} \\ s_{xz} & s_{yz} & \alpha_z \end{bmatrix} \begin{bmatrix} h_x(t) \\ h_y(t) \\ h_z(t) \end{bmatrix} + \begin{bmatrix} \beta_x \\ \beta_y \\ \beta_z \end{bmatrix} + \begin{bmatrix} \varepsilon_x \\ \varepsilon_y \\ \varepsilon_z \end{bmatrix} \quad (1)$$

Using vector notation:

$$\vec{V}(t) = A \cdot \vec{h}(t) + \vec{\beta} + \vec{\varepsilon} \quad (2)$$

where $\vec{V}(t)$ is the sensor outputs at time t, A is the matrix of scale factors, $\vec{h}(t)$ is the vector of the magnetic field that is being measured at time t, $\vec{\beta}$ is the vector of biases, and $\vec{\epsilon}$ is the vector of residual errors.

The norm of the magnetic field in a given location without magnetic interference is constant. This fact is exploited to calibrate the e-compass. In other words, it is known that for all times:

$$H^2 = h_x^2(t) + h_y^2(t) + h_z^2(t) \quad (3)$$

The e-compass calibration should solve for the 9 parameters in A and $\vec{\beta}$. In some cases it can be assumed that the off-diagonal elements of A are zero so that there are only 6 parameters to be computed.

Once calibration is complete the estimate of the magnetic field is given by:

$$\hat{h}(t) = \begin{bmatrix} \hat{h}_x(t) \\ \hat{h}_y(t) \\ \hat{h}_z(t) \end{bmatrix} = (A^T A)^{-1} (\vec{V}(t) - \vec{\beta}). \quad (4)$$

Without loss of generality (because a rotation matrix can always be applied), assume that the system 100 is oriented so that, for example, its x-axis is pointed towards the visual code, the z-axis is pointing up, and the y-axis is pointing left. While the system 100 is stationary (e.g., scanning a visual code), the processor obtains accelerometer readings from the accelerometer 117 to determine two of the three orientation angles (e.g., pitch and roll). The third angle (yaw) is known because the camera is facing the visual code being scanned. In addition, the digital imaging device 114 may measure the orientation of the visual code relative to the imaging device 114 to more accurately estimate these angles. Once pitch, roll, and yaw are known, a rotation matrix preferably is applied such that the system 100 has an assumed orientation, in this case the yaw angle ϕ(t) and the residual rotation angle θ(t) should have known values:

$$\hat{\varphi}(t) = \arctan\left(\frac{\hat{h}_y(t)}{\hat{h}_x(t)}\right) = \varphi \quad (5)$$

$$\theta(t) = \arctan\left(\frac{\sqrt{\hat{h}_x^2(t) + \hat{h}_y^2(t)}}{\hat{h}_z(t)}\right) = 0 \quad (6)$$

where these angles are defined as spherical coordinates, and where the yaw angle ϕ is the angle in the horizontal plane between the x-axis and magnetic North. There are two possible ways to use these angles, as will be explained below in greater detail:

1. Use |θ(t)| and |ϕ(t)−ϕ| to determine the quality of the e-compass calibration.
2. Perform a grid search to find the calibration parameters that minimize |θ(t)| and |ϕ(t)−ϕ| to thereby to correct the calibration of the e-compass. A global search can be performed for the calibration parameters in some embodiments, but in other embodiments, the search is performed around the calibration parameters already computed using a technique such as the one above.

The image code may also be encoded with the true magnetic field measurements at its location. In other words, the image code can provide the true value of $\vec{h} = \vec{h}(t)$ when the system 100 is at a certain orientation relative to the image code. This provides three additional equations that can be used during the calibration by equating $\hat{h}(t)$ and $\vec{h}$ for the time t when the phone was held in front of the image code.

Generally, e-compass calibration requires that the system 100 be rotated in all directions in order to solve the system of equations given above. Knowing $\vec{h} = \vec{h}(t)$ at a given point can help relax this requirement, but measurements from multiple orientations are still required. After holding the system 100 up to the image code for scanning purposes, the user will typically bring it back down—this motion rotates the system 100. During this rotation the e-compass 108 may collect data for calibration. Recognizing an image code therefore preferably triggers an e-compass calibration. To further improve the calibration, the recognition of the image code preferably triggers the system to inform the user to perform a calibration maneuver such as spinning the system.

Furthermore, after reading the image code and calibrating the gyro 110, the gyro can provide accurate estimates of the rotations of the phone for some time. This means at a given instant the tilt, pitch and roll angles are known by integrating the angular rate measurements from the gyro and adding them to the initial angles from when the system 100 was in front of the image code. This effectively provides the true values of ϕ(t) and θ(t) at different times, which makes the e-compass calibration easier. The yaw, pitch, and roll can be defined respectively as:

$$\tan(\varphi(t)) = \frac{h_y(t)}{h_x(t)}, \quad (7)$$

$$\tan(\varphi(t)) = \frac{h_z(t)}{h_z(t)}, \quad (8)$$

$$\tan(\gamma(t)) = \frac{h_x(t)}{h_z(t)}. \quad (9)$$

Assuming that while the digital imaging device 114 is held in front of the image code at time zero, the angles are ϕ(0)=ϕ, φ(0)=0, and γ(0)=0. Then the estimated angles at a future time t are:

$$\varphi(t) = \int_0^t \dot{\varphi}(\lambda) \delta\lambda,$$

$$\phi(t) = \int_0^t \dot{\varphi}(\lambda) \delta\lambda,$$

and $$\gamma(t) = \int_0^t \dot{\gamma}(\lambda) \delta\lambda,$$

where the angular rates come from the calibrated gyro 110. Knowing the values of these angles provides further constraints for the system of equations used for e-compass calibration. One way to use these constraints is to do a grid search for e-compass and/or gyro calibration parameters to minimize the difference between the yaw, pitch and roll angles estimated based on the gyro 110 and the e-compass 108 during the same time interval.

FIG. 3 shows a method 130 of calibrating the e-compass 108 in accordance with some implementations. The various operations may be performed or caused to be performed by the processor 102 executing software 106 in combination with the e-compass 108, gyro 110, and accelerometer 117. The operations may be performed in the order shown, or in a different order. Further, two or more of the operations may be performed in parallel rather than sequentially.

At 132, the method includes initiating a scan of a visual code by a user of the system 100 (and thereby detecting the presence of the visual code itself). While scanning the code, the system 100 also reads a yaw angle from the visual code. The yaw angle read from the visual code indicates the angle of yaw of the system 100 assuming the system is facing the visual code, which would be the case during the visual code scan operation.

At 134, the method includes the processor 102 computing an estimate of yaw angle based on magnetic field measurements, scale factors, and biases from the e-compass 108. At 136, the method includes computing a quality factor based on the yaw angle read from the visual code and the computed estimate of the yaw angle. The two yaw angles ought to be identical or relatively close to the same if the e-compass is properly calibrated. At 138, the processor 102 determines whether the calibration of the e-compass 108 is acceptable based on the computed quality factor.

The visual code may also encode the magnetic declination (i.e., the angle between magnetic north and true north). The e-compass 108 calibration may also include adjusting the determination of magnetic north by the magnetic declination encoded in the visual code. For example, the magnetic declination may be added to, or subtracted from, the determination of magnetic north FIG. 4 shows a more specific implementation of method 130 of FIG. 3. The various operations may be performed or caused to be performed by the processor 102 executing software 106 in combination with the e-compass 108, gyro 110, and accelerometer 117. The operations may be performed in the order shown, or in a different order. Further, two or more of the operations may be performed in parallel rather than sequentially.

At 140, the method includes initiating a scan of a visual code by a user of the system 100 (and thereby detecting the presence of the visual code itself). At that time, the system 100 also reads a yaw angle from the visual code. The yaw angle read from the visual code indicates the angle of yaw of the system 100 assuming the system is facing the visual code, which would be the case during the visual code scan operation.

At 142, the processor 102 obtains measurements from the e-compass 108 and buffers those measurements in, for example, the non-volatile storage device 104. The buffered e-compass measurements are $\vec{V}(t)$ as described above. The scanning of the visual code also causes the processor to calibrate the gyro 110 (144). Because the system 100 presumably is held stationary to image the visual code, visual code scanning is an excellent time to calibrate the gyro 110. Gyro calibration reduces or eliminates offset in the readings from the gyro. Gyro calibration averages out the gyro biases.

At 146, pitch and roll are estimated based on readings from the accelerometer 117. The processor 102 computes the average of the values from each axis of the multi-axis (preferably three-axis) accelerometer 117. The average is computed of samples from a window in time when the system 100 is approximately stationary, such as during visual code scanning. The average, for example, of the accelerometer's x-axis readings is computed as:

$$\bar{a}_x = \frac{1}{N} \sum_i a_x(i) \tag{10}$$

where i is the i-th sample in time, and N is the number of samples in the average. Similar computations are made for the y and z axes of the accelerometer as well. This creates the vector $\bar{a}=[\bar{a}_x\ \bar{a}_y\ \bar{a}_z]$. The processor then computes a unit vector:

$$\tilde{a} = \frac{\bar{a}}{\|\bar{a}\|}. \tag{11}$$

The processor 102 computes pitch as $p=-\sin^{-1}(\tilde{a}_x)$ and roll as $r=a\tan 2(\tilde{a}_y, \tilde{a}_z)$. Roll and pitch matrices are then determined to be:

$$R = \begin{bmatrix} 1 & 0 & 0 \\ 0 & \cos(r) & \sin(r) \\ 0 & -\sin(r) & \cos(r) \end{bmatrix}. \tag{12}$$

$$P = \begin{bmatrix} \cos(p) & 0 & -\sin(p) \\ 0 & 1 & 0 \\ \sin(p) & 0 & \cos(p) \end{bmatrix}. \tag{13}$$

At 148 in FIG. 4, if A and $\vec{\beta}$ are available from a prior e-compass calibration, then at 150, the processor computes $\hat{h}(t)$ based on $\vec{\beta}$, A and $\vec{V}(t)$. The computation of $\hat{h}(t)$ may be made using equation (4) above.

Detilting is performed in operation 152. Detilting maps the orientation of the system 100 from its current orientation during visual image scanning to a predetermined orientation. A technique for performing detilting includes computing $\tilde{h}(t)=P^T R^T \hat{h}(t)$, where the R and P matrices are provided above at (12) and (13), respectively. The values $\tilde{h}(t)$ represents the detilted estimate of the magnetic field.

At 154, the processor computes an estimate of the yaw angle ($\hat{\varphi}(t)$) based on $\tilde{h}(t)$. Specifically, $\hat{\varphi}(t)$ may be computed as:

$$\hat{\varphi}(t) = \arctan\left(\frac{\tilde{h}_y(t)}{\tilde{h}_x(t)}\right) \tag{14}$$

At this point, an estimate of the yaw angle of the system 100 has been computed based on equation (14) and a yaw angle has been read from the visual code. If the e-compass 108 is in proper calibration, the two yaw angles should be approximately identical.

At 156, a residual rotation angle ($\theta(t)$ is computed based on $\tilde{h}(t)$. The residual rotation angle $\theta(t)$ may be computed as:

$$\theta(t) = \arctan\left(\frac{\sqrt{\tilde{h}_x^2(t) + \tilde{h}_y^2(t)}}{\tilde{h}_z(t)}\right) \tag{15}$$

For an e-compass in proper calibration, the residual rotation angle θ(t) should be approximately 0.

In accordance with the various embodiments, a quality factor is computed by the processor (operation 158). In some embodiments, the quality factor (Q(t)) is computed as $Q(t) = |\hat{\phi}(t) - \phi|$, while in other embodiments, the quality factor is computed as $Q(t) = \sqrt{|\hat{\phi}(t) - \phi|^2 + \theta^2(t)}$. The former quality factor is the absolute value of the difference between the computed estimate of the yaw angle and the yaw angle read from the visual code. The latter quality factor is the square root of the sum of the square of two values. The first value is the square of the absolute value of the difference between the computed estimate of the yaw angle and the yaw angle read from the visual code. The second value is the square of the residual rotation angle θ(t).

For either quality factor, the quality factor should be approximately zero for an e-compass that is in proper calibration. At 160, the processor 102 compares the quality factor to a predetermined (preferably low) threshold to determine if the quality factor is below the threshold, thereby indicating proper calibration (162).

If the quality factor θ(t) is above the threshold (indicating improper e-compass calibration), then operations 164 and 166 may be performed to correct the calibration of the e-compass. Operations 164 and 166 are also performed if neither A nor $\vec{\beta}$ were available as determined at operation 148. At 164, the processor re-computes the quality factor using other values of A and $\vec{\beta}$, and at 166, the values of A and $\vec{\beta}$ that resulted in the best (e.g., lowest) quality factor are chosen for use by the e-compass from that point on. In some implementations and as explained above, a global search can be performed for new values of A and $\vec{\beta}$ to use but performing a search around the values of A and $\vec{\beta}$ already computed by the e-compass is more efficient.

Barometer Calibration

Figure 5:
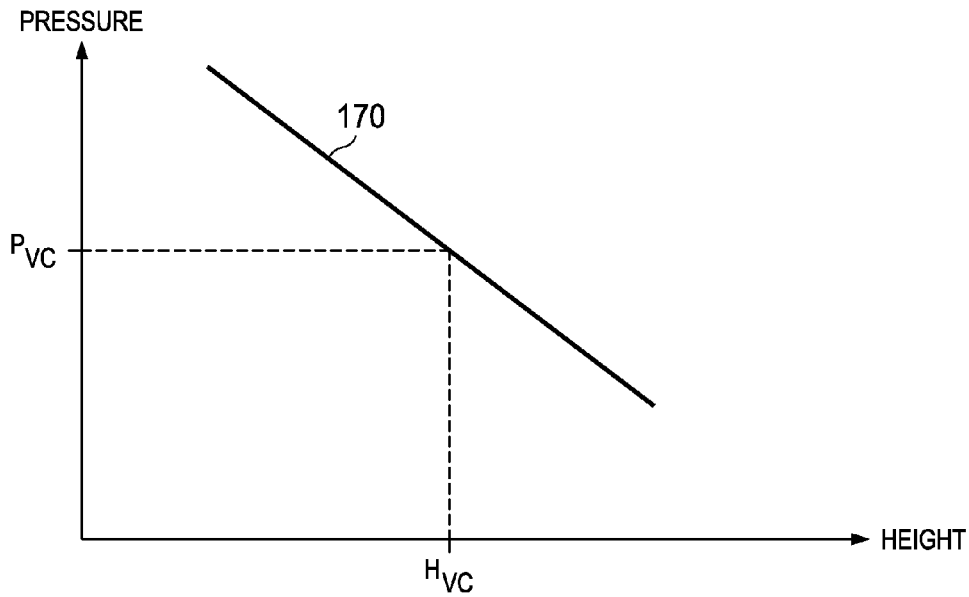
FIG. 5 illustrates the relationship between barometric pressure and height.

The system 100 of FIG. 1 also can be used to calibrate a barometric pressure sensor 112 if the system includes such a sensor. Barometric pressure sensors can be used to determine altitude or the floor of a building at which the system containing the sensor is located. FIG. 5 illustrates the relationship 170 between barometric pressure and height—lower pressure at higher elevations (floors) and higher pressure at lower elevations (floors).

In some embodiments, a visual code is encoded with an altitude or floor number at which the code is located. For example, if the visual code is located at height $H_{VC}$ (the subscript VC indicating the height of the visual code), the height $H_{VC}$ of the visual code is encoded into the visual code. The system 100 uses the digital imaging device 114 to scan the code and read the height $H_{VC}$. During the scanning operation, the processor 102 also may acquire a barometric pressure reading from the system's barometric pressure sensor 112 ($P_{VC}$).

The system 100 (e.g., the software 106) may be programmed with a mathematical relationship between pressure and height such as the following:

$$H_{NEW} = H_{VC} - \left(\frac{P_{NEW} - P_{VC}}{\Delta P / \text{FLOOR}}\right) \quad (16)$$

where $H_{NEW}$ is the system's new height to be determined, $P_{NEW}$ is the barometric pressure reading taken from the system's barometric pressure sensor 112 at the new height, and ΔP/FLOOR indicates the change in pressure for each floor of a building. For this computation, it may be assumed that each floor of a building is approximately the same height (e.g., 10 feet per floor). The new height presumable is different than the height HVC of the visual code but it could be the same. The change in pressure per floor of a building may be encoded into the visual code itself and read by the digital imaging device 114 of the system 100 or may be pre-programmed into the system. Further, the relationship between pressure and floors of a building may instead indicate the relationship between pressure altitude measured in, for example, feet above/below sea level.

Referring to equation (16), the values of $H_{VC}$, $P_{VC}$, and ΔP/FLOOR are known. To determine the floor number (or altitude) of the system, the processor causes the barometric pressure sensor 112 to report a barometric pressure reading which the processor 102 inserts into equation (16) as $P_{NEW}$ to compute $H_{NEW}$ (the system's current floor/altitude).

Figure 6:
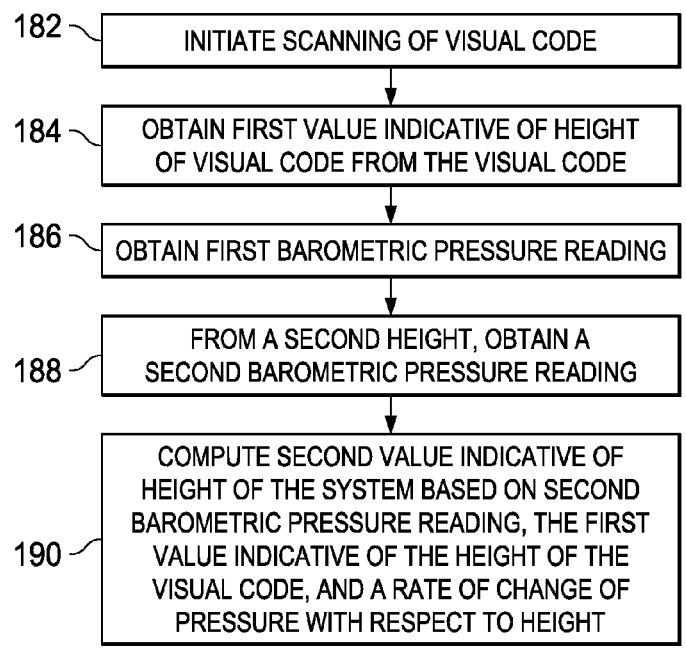
FIG. 6 shows a method of calibrating a barometric pressure sensor based on scanning a visual code in accordance with various implementations.

FIG. 6 shows a method of calibrating the barometric pressure sensor 112. The various operations may be performed or caused to be performed by the processor 102 executing software 106 in combination with the barometric pressure sensor 112. The operations may be performed in the order shown, or in a different order. Further, two or more of the operations may be performed in parallel rather than sequentially.

At 182, the method includes initiating a scan of a visual code by a user of the system 100. At 184, the method includes obtaining a first value indicative of the height (e.g., floor number, altitude, etc.) of the visual code from the visual code.

At 186, the method further includes obtaining a first barometric pressure reading from the barometric pressure sensor 112 while scanning the visual code. Thus, scanning the visual code causes the processor to obtain a pressure reading. At that point, the system has values of the height of the visual code and the barometric pressure at that height, which the system can use in equation (16) as explained above.

At 188, the system has been moved to a different height. For example, the user of the system may have moved to a different floor in a building. The method includes the processor obtaining a second barometric pressure reading at the new height. The values are all used in equation (16) and the system computes (at 190) a second value indicative of height based on the second barometric pressure reading, the first value indicative of the height of the visual code, and the rate of change of pressure with respect to height (e.g., floor).

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A system, comprising:
    an imaging device;
    an e-compass;
    an accelerometer; and
    a processor coupled to the imaging device, the e-compass, and the accelerometer, wherein the processor causes the imaging device to scan a visual code, read a yaw angle from the visual code, and compute an estimate of a yaw angle based on magnetic field measurements taken by the e-compass and scale factors and biases determined from measurements generated by the e-compass;

wherein, based on scanning the visual code, the processor computes a quality factor based on the yaw angle read from the visual code and the estimate of the yaw angle.

2. The system of claim 1 wherein the processor computes the estimate of the yaw angle based on an estimate of the magnetic field.

3. The system of claim 2 wherein the processor detilts the estimate of the magnetic field and computes the estimate of the yaw angle based on the detilted estimate.

4. The system of claim 2 wherein the processor detilts the estimate of the magnetic field and computes the estimate of the yaw angle based on a ratio of two coordinate components of the detilted estimate.

5. The system of claim 4 wherein the processor detilts the estimate of the magnetic field and computes the estimate of the yaw angle based on a computation of the arctangent of the ratio of the two coordinate components of the detilted estimate.

6. The system of claim 1 wherein the processor computes the quality factor by subtracting one of the yaw angle read from the visual and the estimate of the yaw angle from the other of the yaw angle read from the visual code and the estimate of the yaw angle.

7. The system of claim 4 wherein the processor computes a residual rotation angle based on the detilted estimate.

8. The system of claim 4 wherein the processor computes a residual rotation angle by computing an arctangent of a ratio of a numerator to a denominator, the numerator being a square root of the sum of the squares of two coordinate components of the detilted estimate and the denominator being a third component of the detilted estimate.

9. The system of claim 8 wherein the processor computes the quality factor by computing a square root of a sum of a first value and a second value, the first value being a square of an absolute value of one of the yaw angle read from the visual code and the estimate of the yaw angle subtracted from the other of the yaw angle read from the visual code and the estimate of the yaw angle, and the second value being the square of the residual rotation angle.

10. The system of claim 2 wherein the processor determines whether the e-compass is satisfactorily calibrated by comparing the quality factor to a threshold.

11. The system of claim 2 wherein, based on the processor determining the e-compass not to be satisfactorily calibrated, the processor re-computes the quality factor based on different scale factors and biases and selects particular scale factors and biases that result in a better quality factor.

12. The system of claim 2 wherein the visual code encodes a value indicative of magnetic declination and the processor uses the imaging device to read the value of magnetic declination from the visual code and adjust a calibration of the e-compass based on the value of the magnetic declination.

13. The system of claim 2 wherein the processor determines whether the e-compass is satisfactorily calibrated based on the quality factor.

14. A method of calibrating an e-compass of an electronic device, comprising:

using a digital imaging device of the electronic device to scan a visual code containing encoded information;

using a processor of the electronic device to read, from the encoded information corresponding to the scanned visual code, a yaw angle;

using the e-compass to acquire magnetic field measurements and to determine scale factors and biases from the magnetic field measurements; and using the processor to:
compute an estimate of yaw angle based on the magnetic field measurements, the scale factors, and the biases from the e-compass;
compute a quality factor based on the yaw angle read from the visual code and the estimate of the yaw angle;
determine whether calibration of the e-compass is acceptable based on the quality factor; and
when the calibration of the e-compass is determined to be acceptable based on the quality factor, determine location information of the electronic device based at least partially on measurements taken using the e-compass and provide the location information to at least one application on the electronic device.

15. The method of claim 14 further comprising using the processor to compute an estimated pitch and roll from measurements taken from an accelerometer.

16. The method of claim 15 further comprising using the processor to compute an estimate of the magnetic field.

17. The method of claim 16 further comprising using the processor to detilt the estimate of the magnetic field based on the estimated pitch and roll.

18. The method of claim 17 wherein computing the estimate of the yaw angle is based on the detilted estimate of the magnetic field.

19. The method of claim 17 wherein computing the estimate of the yaw angle comprises computing an arctangent of a ratio of one axis component of the detilted estimate of the magnetic field to another axis component of the detilted estimate of the magnetic field.

20. The method of claim 14 wherein computing the quality factor comprises subtracting one of the yaw angle read from the visual code and the estimate of the yaw angle from the other of the yaw angle read from the visual code and the estimate of the yaw angle.

21. The method of claim 14 wherein computing the quality factor comprises computing a square root of a first term added to a second term, the first term being the square of the absolute value resulting from subtracting one of the yaw angle read from the visual code and the estimate of the yaw angle from the other of the yaw angle read from the visual code and the estimate of the yaw angle, and the second term being a square of a rotation angle.

22. The method of claim 14 further comprising correcting the calibration of the e-compass based on the quality factor exceeding a threshold.

23. The method of claim 14, wherein the visual code comprises a quick response (QR) code.

* * * * *